US006832178B1

(12) United States Patent
Fernandez et al.

(10) Patent No.: US 6,832,178 B1
(45) Date of Patent: Dec. 14, 2004

(54) METHOD AND APPARATUS FOR MULTI-SENSOR PROCESSING

(75) Inventors: Dennis S. Fernandez, 1175 Osborn Ave., Atherton, CA (US) 94027; Irene Y. Hu, 1240 Avon St., Belmont, CA (US) 94002

(73) Assignees: Dennis S. Fernandez, Atherton, CA (US); Irene Y. Hu, Belmont, CA (US)

( * ) Notice: Subject to any disclaimer, the term of this patent is extended or adjusted under 35 U.S.C. 154(b) by 0 days.

(21) Appl. No.: 09/949,322

(22) Filed: Sep. 7, 2001

Related U.S. Application Data

(62) Division of application No. 09/220,784, filed on Dec. 23, 1998, now Pat. No. 6,415,188.

(51) Int. Cl.$^7$ ............................................. G06F 15/00
(52) U.S. Cl. ......................................... 702/189; 703/17
(58) Field of Search ................................ 702/117, 122, 702/186, 188–189; 703/6, 11, 13, 17; 436/164, 172, 174, 37

(56) References Cited

U.S. PATENT DOCUMENTS

| | | | |
|---|---|---|---|
| 4,009,525 A | | 3/1977 | Hollander |
| 5,006,987 A | | 4/1991 | Harless |
| 5,590,062 A | | 12/1996 | Nagamitsu et al. |
| 5,592,657 A | * | 1/1997 | Johnson et al. ............... 703/21 |
| 5,654,904 A | * | 8/1997 | Thakur ....................... 702/137 |
| 5,657,245 A | * | 8/1997 | Hecht et al. ................. 700/287 |
| 5,662,523 A | | 9/1997 | Yasumaru et al. |
| 5,736,982 A | | 4/1998 | Suzuki et al. |
| 5,739,811 A | | 4/1998 | Rosenberg et al. |
| 5,777,201 A | * | 7/1998 | Poutre et al. ................ 800/281 |
| 5,785,630 A | | 7/1998 | Bobick et al. |
| 5,822,544 A | | 10/1998 | Chaco et al. |
| 5,846,708 A | * | 12/1998 | Hollis et al. ................... 435/6 |
| 5,980,256 A | * | 11/1999 | Carmein ....................... 434/55 |
| 6,002,839 A | * | 12/1999 | Keeler et al. ................. 706/23 |
| 6,016,476 A | * | 1/2000 | Maes et al. .................... 705/1 |
| 6,050,822 A | * | 4/2000 | Faughn ........................ 434/11 |
| 6,097,927 A | * | 8/2000 | LaDue ........................ 434/308 |
| 6,102,958 A | * | 8/2000 | Meystel et al. ................ 703/2 |
| 6,178,395 B1 | * | 1/2001 | Gee ............................ 703/22 |
| 6,275,213 B1 | * | 8/2001 | Tremblay et al. ........... 345/156 |
| 6,278,962 B1 | * | 8/2001 | Klimasauskas et al. ....... 703/13 |
| 6,296,766 B1 | * | 10/2001 | Breckenridge .............. 210/613 |
| 6,380,990 B1 | * | 4/2002 | Bessel ........................ 348/806 |
| 6,393,375 B1 | * | 5/2002 | Sivathanu ................... 702/135 |
| 6,453,305 B1 | * | 9/2002 | Glassman et al. ............ 705/59 |
| 6,458,080 B1 | * | 10/2002 | Brown et al. ............... 600/300 |
| 6,511,377 B1 | * | 1/2003 | Weiss .......................... 463/25 |

OTHER PUBLICATIONS

Chen, et al., "A Mixed–Mode Smart Transducer Interface for Sensors and Actuators," Sound and Vibration, Apr. 1998, pp. 2–5.

(List continued on next page.)

*Primary Examiner*—Marc S. Hoff
*Assistant Examiner*—Mary Catherine Baran
(74) *Attorney, Agent, or Firm*—Fernandez & Associates, LLP.; Dennis S. Fernandez

(57) ABSTRACT

A multi-sensor system for the real-time embedded monitoring of an object senses mixed-mode object conditions. Various sensors separately provide disparate analog signals representing different measurable attributes regarding the sensed object. For example, such sensors may separately sense temperature, pressure, or other biometric value. Then, according to a specified rule set or other qualifying parameters, a digital signal is generated by a processor or controller to indicate one or more condition of the sensed object according to certain sensor input values. Additionally, such multi-sensor scheme may be coupled to a digital network or otherwise coupled thereto for simulation and/or communication applications.

20 Claims, 5 Drawing Sheets

OTHER PUBLICATIONS

Van Putten, et al., "Multiple–Sensor Micro–System for Pulmonary Function Diagnostics for COPD and Asthma Patients," Dec. 1, 2000, Proceedings of the Sesans Workshop.

Barford, et al., "Choosing Designs of Calibration Transducer Electronic Data Sheets," Hewlett. Packard, pp. 1–8, Helwett Packard Company 1998, New Haven, Connecticut.

Allan, Roger. "Silicon MEMS Microstructure Cavities May Foster Implantable Neuro–Electronic Circuits"4, University of SaoPaulo Research, Electronic Deisgn, Oct. 12, 1998.

Young, J.S. "Architecture of Smart, Distributed Sensor Systems," Jan. 10, 1996, 5 pgs., http://www.cad.eecs.berkeley.edu/homepage/jimy/research/sensors/ARPAsummary.html.

Datasheet: "Cognisense sensor Interface Circuit EDM710", 1 page, EDC, Columbia, MD, Jun. 29, 1998.

Datasheet: "EDC Cognisense RS–485 Network Node EDC 1451.2–MA," 2 pgs., EDC, Columbia, MD, Oct. 2, 1998.

Datasheet: "Cognisense Smart Sensor Module EDI520", 3 pgs., EDC Columbia, MD, Jun. 29, 1998.

Costlow, T., "Smart Sensor Standard looks for Takeoff," EETimes, Oct. 8, 1998, 4 pgs, http://www.eet.com/story/OEG199810085014.

Johnson, R., "Proposed IEEE P1451 Architecture–Partitioning and Nomenclature for the P1451.3 and P1451.4 Extensions to the Standard," 8 pgs., Jun. 19, 1997.

Johnson, R., Proposed IEEE P1451 Architecture–Combined P1451.3 and P1451.4 Working Groups Meeting, Jun. 23, 1997, EDC, 11 pgs.

Warrior, J., "Smart Sensor Networks for the Future," 9 pgs., 1997, http://www.sensormag.com/net_mar.html.

Press Release: Tactile Sensation Shakes Audio Sound Field: New Sensory Gaming Experience–*Intensor*–Elevates Video Gaming to High Levels, 3 pgs., May 28, 1998, BSG Labs.

* cited by examiner

METHOD AND APPARATUS FOR MULTI-SENSOR PROCESSING

RELATED U.S. APPLICATION DATA

This application is a divisional of U.S. patent application Ser. No. 09/220,784, entitled "METHOD AND APPARATUS FOR MULTI-SENSOR PROCESSING" by FERNANDEZ, et al., filed on Dec. 23, 1998 now U.S. Pat. No. 6,415,188.

FIELD OF INVENTION

Invention relates to electronic sensors, particularly to distributed sensor arrays for processing mixed-mode conditions.

BACKGROUND OF INVENTION

Conventional electronic sensors are used in various industrial and commercial applications, for example, whereby a certain transducer-type device may measure a physical condition and generate an electrical signal which represents such measured condition. Conventional sensors, however, typically generate analog signals and are not designed to interface easily to digital networks. Although more recently, electronic industry attention has increasingly turned toward coupling so-called embedded processing elements to digital networks, such recent approaches provide a limited capability in processing multi-sensor systems, particularly for digital networks.

SUMMARY OF INVENTION

Invention resides in a multi-sensor system and method to enable the interactive sensing of mix-signal attributes to determine an object condition. Sensors separately measure different physical attributes to generate corresponding analog signals. Then, according to a specified rule set or other qualifying parameters, a digital signal is generated by a processor or controller to represent one or more condition of the sensed object according to such sensor signals. A multi-sensor scheme may be coupled to a digital network or electronic facility for simulation and/or communication.

DETAILED DESCRIPTION OF PREFERRED EMBODIMENT

Figure 1:
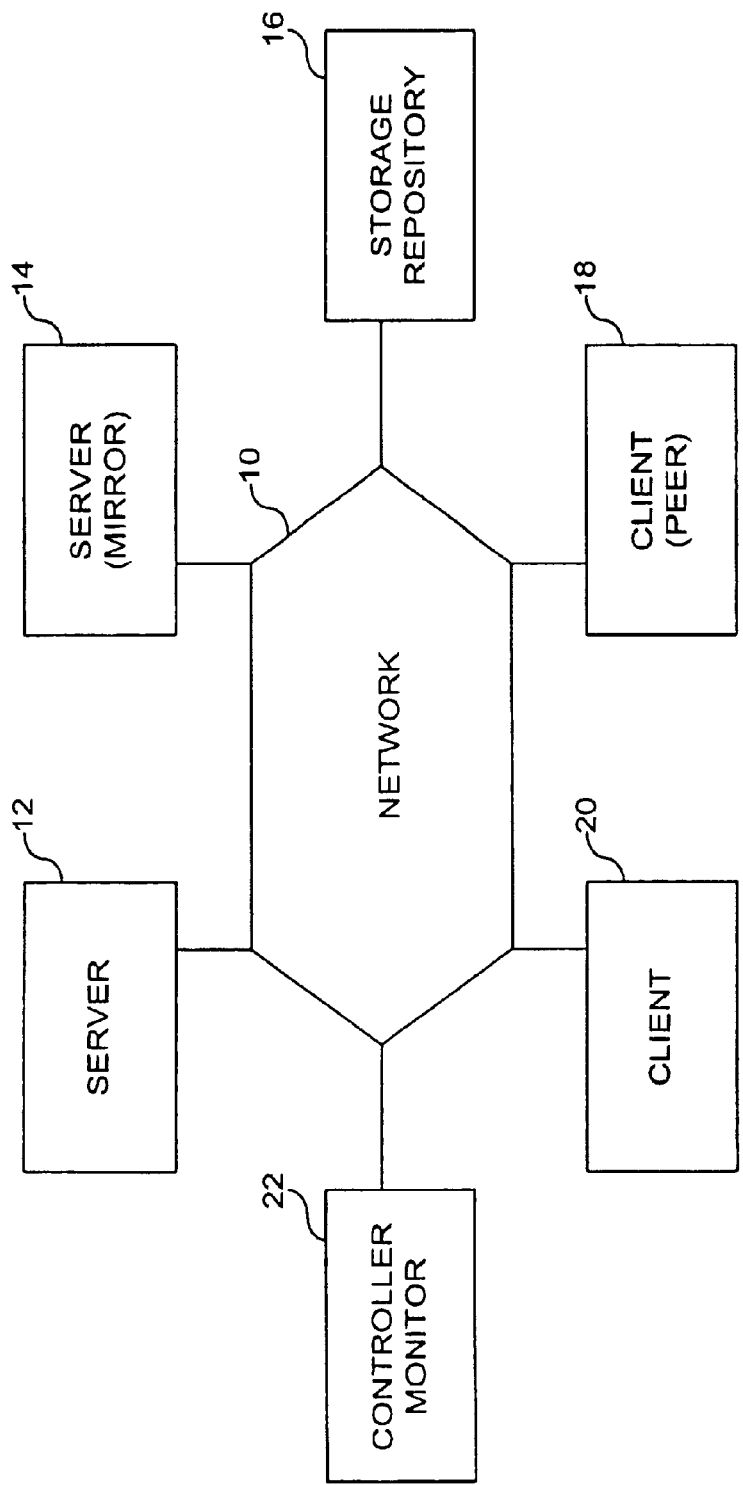
FIG. 1 is a general system or network diagram for implementing present invention.

FIG. 1 general diagram shows a digital system having an interconnected network 10 for coupling servers 12, 14, clients 18, 20, storage repository 16, and controller 22. The network 10 may include one or more local, medium or wide area interconnection or other digital wired or wireless linkage accessible according to one or more standard networking protocol, such as the Internet World-Wide Web, TCP/IP, or other Internet Protocol (IP) convention. Clients 18, 20, servers 12, 14, controller 22, and storage 16 may include one or more network-accessible computer, processor, controller or other system node for processing and/or storing digital data.

Preferably, the server 14 serves as a fault-tolerant functional mirror or data replication facilities for server 12, such that severs 12, 14 are managed to store the same data. Also, the client serves as a peer of client 20, such that client-to-client communication may be accomplished for a direct data or signal transfer therebetween. Additionally, the storage repository 16 serves as one or more network-accessible peripheral storage or memory facility for storing digital data, such as temporary caching of simulation or communications data or control files or signals.

The controller or monitor 22 serves as one or more network-accessible computing or processing facility for enabling sensing and related functions or other network system management tasks, as described herein. For example, the controller 22 may serve as a system manager for initializing, coordinating, or otherwise controlling network tasks or other client-server distributed applications, such as video-conferencing or simulation programs executed among a number of client users coupled to the network.

Figure 2:
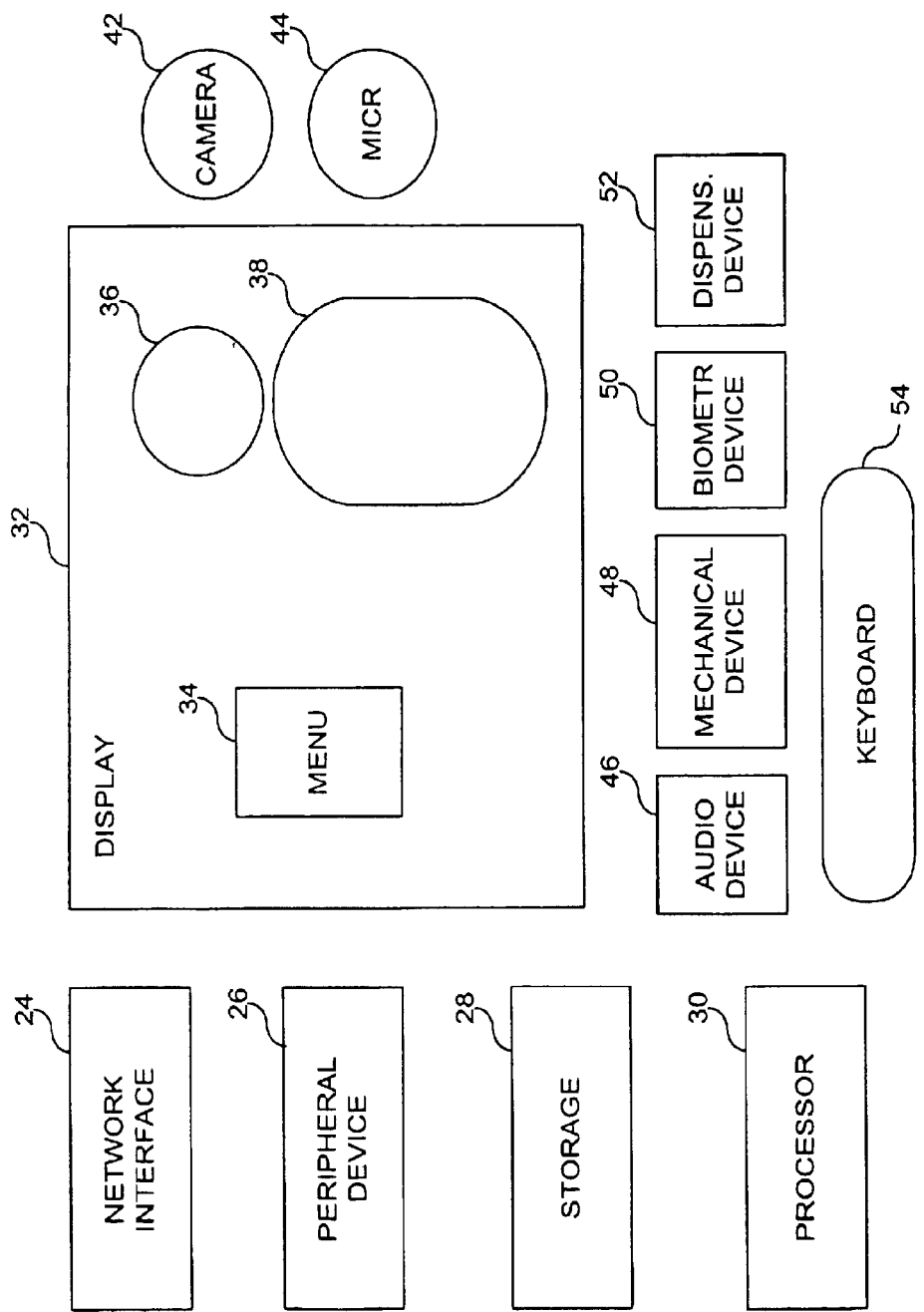
FIG. 2 is a block diagram of the client for implementing present invention.

FIG. 2 block diagram shows a client 20 preferred configuration, including video or screen display 32, network interface 24, peripheral device 26, storage or memory 28, processor 30, speaker or audio device 46, actuator or mechanical device 48, sensor or biometric device 50, dispenser device 52, keyboard or mouse device 54, camera 42, and microphone 44. As shown, display 32 may include one or more graphics-based user menu interface 34 and one or more symbolic, simulated, video, animated, or otherwise graphics-based depiction of an individual or object 38 having an identifiable face 36, icon, avatar, or other representation thereof.

The display 32 may provide visual information according to a holographic, 3-dimensional virtual reality, or other similarly enhanced graphic dimensional effect. Similarly, the speaker or audio device 46 may provide a multi-channel or other enhanced stereoscopic or "surround-sound" effect. Additionally, the mechanical device 48 may operate as micro or miniaturized actuator, robotic-link, vibrator, or other movable element. The dispenser device 52 may electro-mechanically provide the client user with requested, programmed, or otherwise computer-assisted packaged goods, medicine, liquids, solutions, consumable items, or other dispensable material.

Preferably, the dispenser device 52 may indicate to server 12, 14 or other network node the current condition related to dispensing material, such as the remaining amount. Optionally, one or more sensors may be implemented on the keyboard 54 or mouse device, such that user finger or hand condition sensing is facilitated.

It is contemplated herein that the client 20 may be configured, at least in part, by assembling a conventional personal computer, TV set-top device, laptop, palmtop, engineering workstation, computer-implemented automated transaction booth or "kiosk", or other network-accessible processing node, which is programmed and equipped to function according to the present invention as described herein. In one embodiment of the present invention, it is further contemplated that a biometric device or sensor array module 50 may couple directly to the network 10, without being included in, or having to couple through, client 20.

Figure 3:
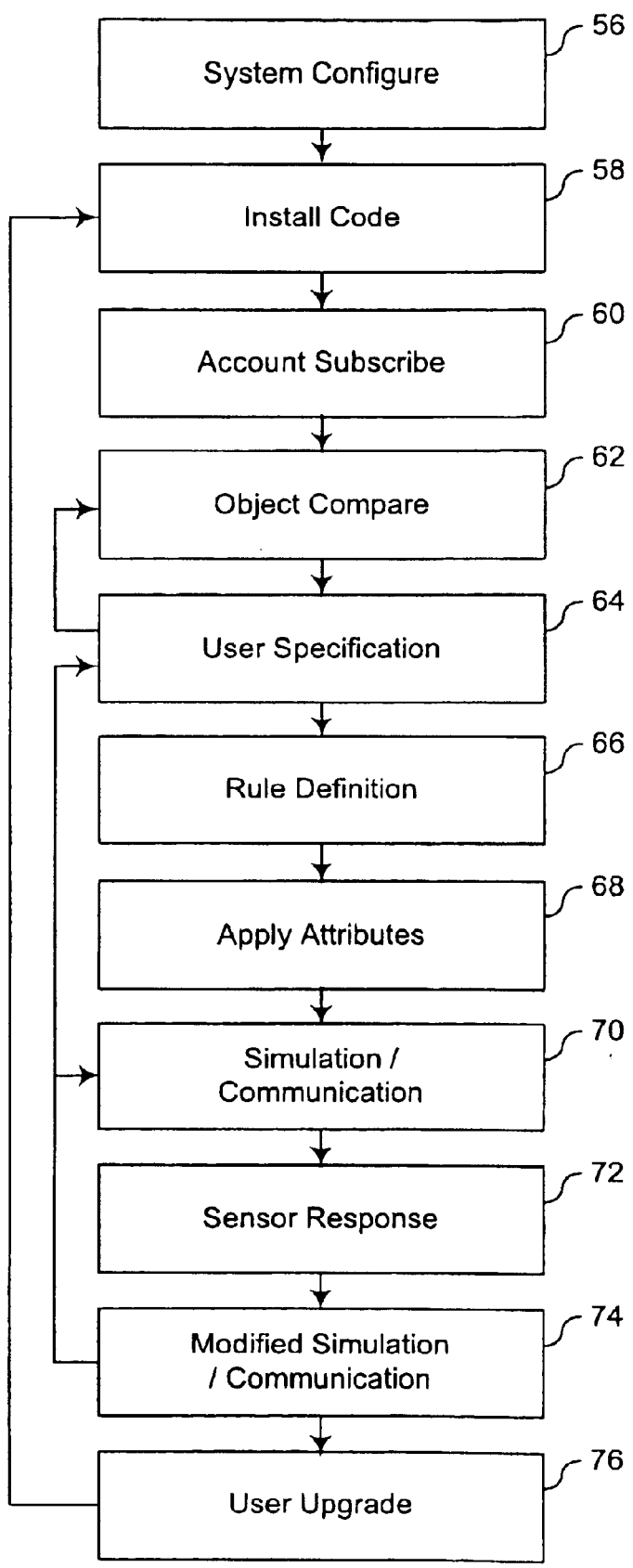
FIG. 3 is a flow chart of the operational steps for implementing the present invention.
Figure 4:
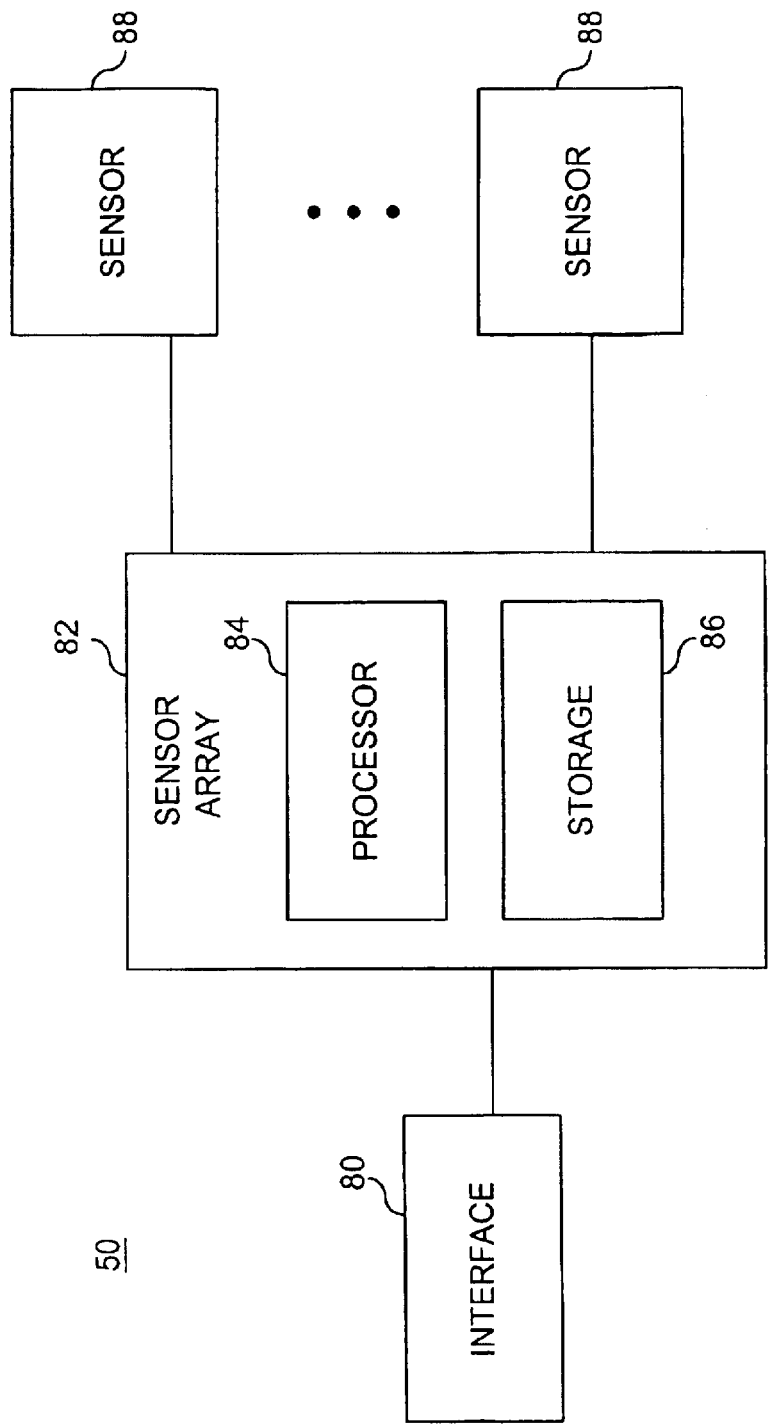
FIG. 4 is a block diagram of the biometric or multi-sensor module for implementing the present invention.

In accordance with certain aspects of the present invention, FIG. 3 flow chart shows the operational steps for implementing the multi-sensor system for the real-time embedded monitoring of one or more objects under mixed-mode sensing conditions. Further, in this regard, as shown in FIG. 4 block diagram, the biometric sensing device 50 having a network interface 80, includes various sensors 88 for separately providing, preferably through analog-to-digital (A/D) converter circuit, to the processor 84 and storage 86 of the sensor array 82 disparate analog signals representing different measurable attributes regarding the sensed object.

Preferably, sensor subsystem integration is achieved through a microelectromechanical systems (MEMS) approach by providing, most if not all, electronic circuits including processor 84, storage 86, interface 80, sensors 88, and any A/D converter circuits on a common semiconductor substrate or die, although it may be more appropriate to provide interface 80 and sensors 88 on separate substrates or dice. In one embodiment, it is contemplated that multiple sensors may couple and provide mix-mode sensed signals to a common processing circuit.

For example, one or more such sensor modules may be implemented, at least in part, for functional operation according to the present invention as described herein, using commercially available devices, such as product part numbers EDI 520 (smart sensor module), EDM 710 (sensor interface circuit), RS-485 (network node) from Electronics Development Corporation (Columbia, Md.).

In particular, preferably one set of one or more sensors 88 may sense and monitor one type of object condition, and another set of one or more sensors 88 may sense and monitor another type of object condition. For example, for a given individual subject being monitored, a first sensor set may monitor person temperature at one or more bodily sources, while a second sensor set may monitor same person perspiration rate at one or more bodily sources.

Hence, such multi-sensor set system serves to monitor related and/or possibly unrelated conditions associated with a common object or object set monitored during simultaneous, temporally close, or otherwise relatively proxime time periods. In accordance with one aspect of the present invention, the sensor array processing circuitry 82 operates to receive such multi-sensor signals which indicate the sensed conditions representing the different sensor or sensing signal types, classes, attributes, or other monitorable grouping, and thus process such effectively mix-mode signals to determine whether certain monitored object(s) or individual(s) previously, currently, or is likely to, fall within a certain specified condition(s), as determined by processing such mix-mode sensor signals.

In this mix-mode approach, signal processing by the processor 84 is performed in an effectively combined and integrated manner according to one or more common rule set, user specification or other programmed instructions, which may classify and therefore indicate a monitored object condition or sensed state logically or inferentially according to the actual input sensed signal values corresponding to different modes or other physically measured grouping.

Hence, preferably, to achieve improved overall system or partial subsystem integration, the processor 82, or a functionally comparable digital signal processing circuit, serves separately to receive and process multiple-type sensor signals or signal sets, whereupon such sensor signals or signal sets represent different physically sensed or otherwise electronically monitorable conditions, states, attributes, modes, or quality of sensing thereof.

For example, the processor 84 may locally execute an instruction set in storage 86, to analyze, compare, correlate, or otherwise process received mix-mode signals according to the specified rules or heuristics to indicate remotely whether a subject individual may be diagnosed as having symptoms of one or more medical conditions, and therefore require the dispensing of certain medicines or other goods or supplies. Such "smart sensor" processing and analysis may also be accomplished using a digital signal processor having logically or functionally equivalent programming, or circuit configuration.

Thus, such intelligently determined conditions may be generated as more concise findings, flags, warnings, or other indications provided as feedback, preferably in digital packet, datagram, frame, or other capsulized format, through the interface 80 for network access, for example, to serve as input values to the simulator module 90 for fantasy gaming application, or communication module 94 for video-conferencing application. Optionally, interface 80 may provide a sensor feedback data signal through the network 10 according to one or more established or known network or bus interface standards, such as the IEEE 1451 standard for interfacing to smart sensors, which are hereby incorporated by reference.

Generally, such sensors 88 may be fixed, mobile, wirelessly-connected or wired, and separately sense temperature, pressure, physiological vital information (e.g., heart beat rate, blood pressure, etc.), or other biometric value. For example, one or more sensors in array 82 may be worn, implanted, attached, or provided by an individual object on clothing or vehicle, or otherwise provided in contact thereto with one or more external or internal bodily locations.

In one embodiment, it is contemplated herein that such sensors 88 may be provided, for example, as one or more silicon-based micro-machined microstructure cavities which may be implanted for applicable modes such as the neuro-electronic monitoring of cell metabolism and controlling of cell activity.

Also, such sensors 88 may be configured to monitor one or more voluntary and/or involuntary conditions, possibly considered herein as distinct sensory modes, of a subject user or other observed party, such as skin temperature, perspiration rate, or other measurable physiological conditions. In particular, preferably, sensor array 88 operates in an intelligent or "smart" manner, such that, for example, the distributed sensors, actively or passively, synchronously or asynchronously, sense and generate sensing signals according to pre-programmed logical rules or other user specifications, such as determining an acceptable manufacturing tolerance or safety conditions.

In one embodiment of the present invention, sensor array 82 functions selectively or logically to screen, filter, sensor, or otherwise exclude or enable access representative signaling of certain sensed or otherwise observed conditions, optionally during specified times, dates, or other specified temporal segments, such as the control of mature-audience programming. For example, within a given monitoring period, the processor 84 may compute or compare to determine, and accordingly indicate for network access, that received sense signals comply or violate a certain specified range, or fall within particular margins. Optionally, the processor 84 may selectively access one or more sensors 88 belonging to one or more selected mode, grouping, or other pre- or user-specified classification, such as a higher-resolution, reliability, or quality sensor group.

Also, the present distributed sensor array architecture may provide for directed, hierarchical, self-navigating or organizing, adaptive, or otherwise flexibly programmable access to one or more sensors in the array 82, such as by providing a tiered quality of service access to a varying level of sensor sensitivity, reliability, accuracy, performance, or other relevant sensor parameter.

For example, in a hierarchical-style embodiment of the present invention, a first set of mix-mode sensed signals are received for processing as described herein to generate a first processed signal indicating one monitored mode or other level of functional abstraction, which represents a logical determination according to a rule-based interpretation or analysis of such first set of received mix-mode signals. Then, a second set of mix-mode sensed signals are received for processing as well to generate a second processed signal indicating another monitored mode or other level of functional abstraction, which represents a different logical determination according to a rule-based interpretation or analysis on such second set of received mix-mode signals.

Furthermore, such mix-mode first and second processed signals are received, in hierarchical or tiered fashion, for further processing according to a rule-based interpretation or analysis as described herein to generate yet a third processed signal to serve as sensory feedback according to a higher-level monitored mode or other level of functional abstraction.

Generally, according to a specified rule set or other qualifying parameters, a digital signal is generated by the processor or controller 84 to indicate one or more conditions of the sensed object according to certain sensor input values. Additionally, referring further to FIGS. 5A and 5B, such multi-sensor scheme may be coupled to a digital network 10 or otherwise coupled thereto for simulation and/or communication applications 90, 94, as described in more detail herein.

Referring to FIG. 3, initially, the multi-sensor system, is configured 56 functionally with system components preferably as illustrated in FIG. 2, and the source or object software, computer program, or other instruction code is installed 58 in such system for an operation as described herein.

Optionally, one or more system users or corresponding clients 18, 20 subscribe 60 to, or are otherwise provided with, an authorized user or group user accounts for secure system access, for example, as a member for enabling exclusive access to one or more network-accessible programs, files, or other restricted objects. Authorization may be accomplished by an identifiable user entry or other input through a keyboard, mouse, voice, facial image recognition, finger print detection, retinal scan, smart card input, or other unique user entry, for example, by using a peripheral device 26 as input processing device.

Optionally, authorization may be provided by a user entry of a unique password or other identifiable signature, such as genetic sequencing or other related data. Also, optionally, upon user authorization 60, an authorized user may cause client 20 to conduct one or more comparisons 62 of various objects available from a number of source nodes accessible through the network 10.

For example, the object compare 62 serves to enable a user to conduct on-line product catalog shopping or otherwise select one or more desired objects using a conventional network user interface, such as Internet browser application software. In this manner, a user may specify 64 one or more objects for searching and subsequent comparison 62 thereof, until desired objects are found or otherwise identified for a subsequent transaction. Furthermore, identifiable user entry for authorization purpose provides the server source with a tracking basis to bill or credit such user account for such service, as well as to monitor and otherwise record user usage history, behavior and preferences.

In one embodiment of the present invention, the server 12 or storage 16 may serve as a network-accessible source for requesting, searching, renting, buying, and/or down-loading various software components, upgrades, or other code or data, such as text, graphics, audio, video, models, vectors, images, fantasy or sports games, instructions, commands, or other electronically transmittable messages or signals, which are sensed, user-selected or otherwise programmed or monitored according to the present disclosure herein.

Hence, in this manner, such source server 12 or controller 22 may monitor usage or otherwise license the distribution, usage or copying of such down-loaded software to certain target or requesting clients 20, 18. Additionally, in such code distribution scheme, the network 10 serves effectively as a real-time or interactive channel, architectural interface, or transaction platform for enabling a secure subscription by multiple users or clients, particularly for providing multi-sensor related applications.

Moreover, optionally, user may define 66 one or more rules or other heuristic instruction sets according to one or more high-level functional or programming language or applications programming interface, which may be applied as attributes or conditions 68 to the sensing scheme, as described herein. For example, the applied attributes 68 to the sensing scheme, as described herein. For example, the applied attributes 68 may include user-selected objected characteristics, mappable facila imaging features, or language translation dictionaries, for processing the simulated or communicated applications data.

Figure 5A:
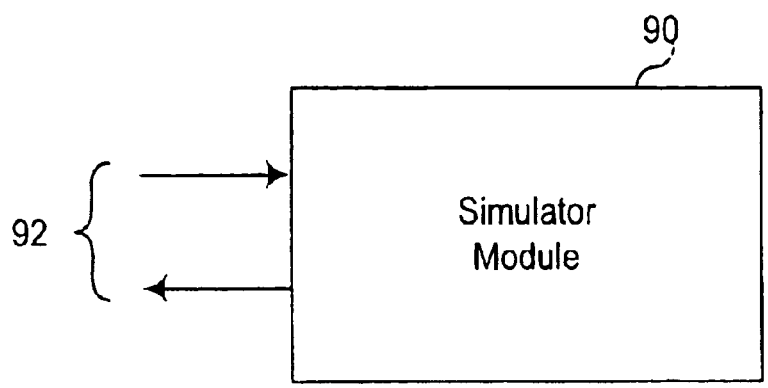
FIGS. 5A–B are simplified diagrams of the simulator and communication modules respectively for the implementing the present invention.
Figure 5B:
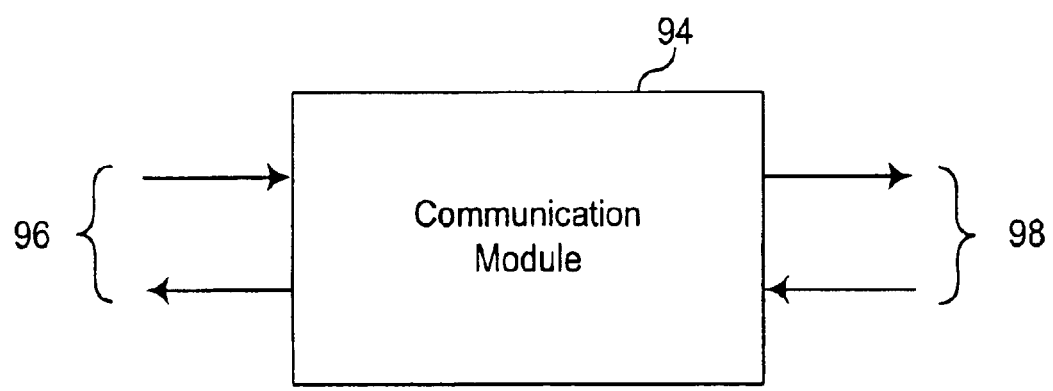

Preferably, multi-sensor functionality is implemented in the context of, or overlaid upon, simulation and/or communication 70, respectively using the simulator module 90 and/or communication module 94, as shown in FIGS. 5A and 5B. In particular, such sensor functionality provides input/output sensed signals 92, 96, 98, whereupon certain sensor signals are generated 72 in response to the detection and measurement of physical conditions or attributes.

Regarding deployment of the simulator module 90, preferably client 20, 18 is provided with, or has access to, one or more software and/or hardware-based simulation or emulation program or functionality for representing the logic, behavior, functionality or other simulatable attribute of a modeled design, operation, condition, prototype, component, circuit, environment, or other computer-representable entity.

For example, the simulator module 90 may include one or more commercially-available computer-implemented simulation program which operate using, at least in part, one or more simulation models. Thus, during simulation of such provided models, one or more input vectors, data or other signals are applicable thereto, such that the simulator may compute and thereby generate one or more proper output vectors, data or other signals responsively therefrom. Such output signals may cause one or more client output devices, such as audio device 46, mechanical device 48, display 32, dispenser device 52, to function accordingly or otherwise interact responsively with client use.

For example, the simulator module 90 may be embodied to provide single or multi-user interactive gaming, therapy, and/or exercise functionality. In one embodiment, such simulation functionality operates in response to, among other things, multi-sensor input signals to enhance simulation experience, as generated according to the present disclosure.

Regarding the deployment of communication module 94, preferably client 20, 18 is provided with, or has access to, one or more software and/or hardware-based communications program, functionality, or other facility for transmitting and/or receiving communications signal for the bi-directional or duplex signal interaction between a number of network-accessible processors or other nodes therein. For example, the communication module 96 may be embodied in a video-conferencing system configured between two or more networked computers for the effectively real-time exchange of images or live video between communicating client or peer parties. In one embodiment, such communication functionality operates by transmitting and/or receiving, among other things, multi-sensor signals to enhance communication experience, as generated according to the present disclosure.

Furthermore, in accordance with such sensor response, communication and/or simulation modules 94, 90 and/or prior user specification may be modified, corrected, or otherwise changed. Optionally, from time to time, client software and other system parameters may be updated, such that the client and/or system code may be remotely programmably upgraded or re-mapped 76.

Generally, the present multi-sensor system is provided herein preferably for the networked cooperation or feature overlay with a simulator and/or video-conferencing application, whereupon, for example, a conventional networked, interactive fantasy gaming program and/or video-conferencing system is enabled with effectively enhanced input or physical sensing of the user or other object associated therewith.

Hence, in this overlaid approach, variously categorized sets of real-time sensory feedback collected, computed, and transmitted from smart sensor arrays provide additional advanced ways for improving networking and control, and thereby raise the level and quality of electronic communication and general user interactivity.

Foregoing described embodiments of the invention are provided as illustrations and descriptions. They are not intended to limit the invention to precise form or application described. In particular, Applicants contemplate that the functional implementation of the invention described herein may be implemented equivalently in hardware, software, firmware, and/or other available functional components or building blocks for various sensor-related commercial, industrial, medical, educational, media, broadcast, entertainment, food, agriculture, clothing, retail, fashion, defense, military, aerospace, automotive, transport, shipping, construction, design, finance, biotech, manufacturing, electronic, security, communications, information, or other related applications, systems or implementations.

Other variations and embodiments are possible in light of the above teachings, and it is thus intended that the scope of the invention not be limited by this Detailed Description, but rather by the Claims following.

What is claimed is:

1. In a network comprising a plurality of interconnected nodes, a multi-user simulation method comprising the steps of:

accessing by a first user and a second user a simulator on a first node in a network;

sensing a first signal having a first mode from a second node in the network;

sensing a second signal having a second mode from the second node;

sensing a third signal having a third mode from a third node in the network;

sensing a fourth signal having a fourth mode from the third node; and executing the simulator according to the first, second, third and fourth signals to generate a simulation output, the simulator using a programmable software model that is network-accessible for multi-sensor and multi-user application, whereby subscriber usage of the software model may be monitored for multi-user licensing transaction, the simulation output being provided to each user of the simulator, the first user being bodily coupled to the second node, and the second user being bodily coupled to the third node, to enable real-time interaction remotely between each user and the simulator through a plurality of sensors that receive physical feedback from the first or second user, wherein the simulator functionally overlays with a video-conferencing application thereby enabling a plurality of users of the simulator to communicate effectively in real-time by exchanging video images of each other, wherein the simulator is accessible effectively when an authorized genetic sequence is identified.

2. The simulation method of claim 1 wherein:

the simulation output comprises an audio or video signal for enabling video-conferencing communication effectively between the users.

3. The simulation method of claim 1 wherein:

the simulation output causes a dispenser associated with the second node to activate.

4. The simulation method of claim 1 wherein:

the first signal comprises a biometric, physiological, genetic, or cellular condition measured for the first user associated with the second node.

5. The simulation method of claim 1 wherein:

the first and second modes separately represent substantially different physical measurable conditions.

6. The simulation method of claim 1 wherein:

the simulation execution is modified in response to the first and second signals.

7. The simulation method of claim 1 wherein:

the first signal is sensed through a network interface coupled thereto effectively to the first signal during a selected time segment or within a qualified sensor group according to a programmable instruction set which is executable by the interface.

8. The simulation method of claim 1 wherein:

the first signal is provided by a silicon-based microstructure having a cavity for sensing a cell condition.

9. The simulation method of claim 1 wherein:

the network access is provided securely according to a user authorization or subscription.

10. The method of claim 1 wherein:

the first and the second signals are generated by a biometric sensor chip for enabling biological contact to monitor neuro-electronically a cell metabolism.

11. The method of claim 1 wherein:

the simulation output causes a mechanical actuator physically to vibrate and dispense a liquid.

12. Network-accessible device for therapeutic exercise comprising:

a processor; and an interface;

wherein the processor through the interface accesses a simulator from a first node in a network, a first signal having a first mode from a second node in the network and a second signal having a second mode from the second node being sensed, the processor causing the simulator to be executed according to the first and second signals to generate a simulation output, the simulator using a programmable software model that is network-accessible for multi-sensor application, whereby subscriber usage of the software model may be monitored for licensing transaction, the simulation output being provided to the subscriber, such subscriber being bodily coupled to the second node to enable real-time interaction remotely between the subscriber and the simulator through a plurality of sensors that receive physical feedback from the subscriber, the simulator modifying the output adaptively in response to such feedback to indicate to the subscriber that a sensed voluntary act of the subscriber comprises an exercise violation, wherein the simulator functionally overlays with a video-conferencing application thereby enabling one or more subscriber of the simulator to communicate effectively in real-time by exchanging video images with another subscriber, wherein the simulator is accessible effectively when an authorized genetic sequence is identified.

13. The device of claim 12 further comprising:

a biometric sensor chip for enabling biological contact to monitor neuro-electronically a cell metabolism, the sensor chip generating the first and second signals.

14. The device of claim 12 further comprising:

a mechanical actuator that physically vibrates and dispenses a liquid in response to the simulation output.

15. Simulation data-structure for fantasy gaming comprising:

a first software representation for modeling a first sensor signal;

a second software representation for modeling a second sensor signal; and a third software representation for modeling a simulation output, whereby subscriber usage of the first, second, and third software representations may be monitored for licensing transaction, the simulation output being provided to the subscriber, such subscriber being bodily coupled to a plurality of sensors to enable real-time interaction remotely between the subscriber and a simulator through the sensors that receive physical feedback from the subscriber, the simulation output enabling a fantasy or game application to be provided electronically to the subscriber selectively according to an on-line subscriber transaction, wherein the simulator functionally overlays with a video-conferencing application thereby enabling one or more subscriber of the simulator to communicate effectively in real-time by exchanging video images with another subscriber, wherein the simulator is accessible effectively when an authorized genetic sequence is identified.

16. The data-structure of claim 15 wherein:

the first and second signals are generated by a biometric sensor chip for enabling biological contact to monitor neuro-electronically a cell metabolism.

17. The data-structure of clam 15 wherein:

the simulation output causes a mechanical actuator physically to vibrate and dispense a liquid.

18. The simulation method of claim 1 wherein:

at least one sensor is accessible adaptively or hierarchically using a self-navigating interconnection.

19. The device of claim 12 wherein:

at least one sensor is accessible adaptively or hierarchically using a self-navigating interconnection.

20. The data-structure of claim 15 wherein:

at least one sensor is accessible adaptively or hierarchically using a self-navigating interconnection.

* * * * *